Patented June 3, 1941

2,244,208

UNITED STATES PATENT OFFICE 2,244,208

POLYMERIC MATERIAL

John B. Miles, Jr., Wilmington, Del., assignor to E. I. du Pont de Nemours & Company, Wilmington, Del., a corporation of Delaware No Drawing. Application October 22, 1937, Serial No. 170,470

12 Claims. (Cl. 18—57)

This invention relates to polymeric materials and more particularly to a method for modifying the properties of synthetic linear condensation polymers.

The polymers with which this invention is concerned are described in United States Patents 2,071,250–253. These polymers, of which the polyamides are particularly valuable for the purpose of this invention can be formed into filaments which are capable of being cold drawn, i. e., elongated under application of tensile stress, into fibers which show molecular orientation along the fiber axis. The oriented filaments or fibers are stronger and more elastic than the unoriented filaments from which they are prepared and are of much greater utility in the preparation of fabrics, etc. The above patents state that ribbons, bands, films, sheets, and the like can also be prepared from the synthetic linear condensation polymers. Although the properties of the sheet materials are also greatly improved by cold drawing, it is a difficult matter to cold draw these products, unless they are properly prepared and quite thin.

An object of this invention is to improve the properties of synthetic linear condensation polymers, particularly when in the form of ribbons, sheets, rods, and the like. Another object is to prepare objects having a high degree of molecular (crystallite) orientation from synthetic linear condensation polymers. Other objects will appear hereinafter.

I have now found that the properties of synthetic linear condensation polymers can be greatly improved by subjecting them to cold working which for the purpose of this invention includes any mechanical process for applying compressive stress to the solid polymer whereby the polymer is caused to flow in a preferred direction. It includes such operations as milling or rolling, extrusion under high pressure through suitable orifices, die stamping, and die drawing. It does not include cold drawing in which tensile stress is used as the sole means for causing the polymer to flow in a preferred direction, but does include processes in which cold drawing and cold working are applied simultaneously. The cold working of the polymer, preferably by cold rolling, can be applied to bulky polymer masses, which cannot be cold drawn satisfactorily. Thus, sheets can be cold drawn only with difficulty whereas I have found that they can be easily cold rolled into oriented products. Furthermore, cold rolling can produce a different type of orientation than cold drawing, as applied to filaments, because the forces being compressive instead of tensile can cause the material to flow in all directions perpendicular to the direction of the compressive force. The result is that in a cold rolled sheet the majority of the crystallites are so arranged that a given plane of the crystallites parallel to the long axis of the crystallite or molecule is substantially parallel to the surface of the sheet.

The synthetic linear condensation polymers as described in the above mentioned patents are obtainable by condensation polymerization from bifunctional reactants. The polymers differ from most resinous and plastic materials in that they have rather sharp melting points and show little tendency to soften below their melting point. The polymers are crystalline in character. The highly polymerized products (superpolymers) are capable of yielding oriented filaments of great value. Of these polymers, the polyamides yield particularly valuable products when treated according to the process of this invention. This invention will therefore be decsribed with particular reference to the polyamides.

The polyamides are of two types, those derived from polymerizable monoaminomonocarboxylic acids and their amide-forming derivatives, and those derived from the reaction of suitable diamines with suitable dicarboxylic acids or amide-forming derivatives of dibasic carboxylic acids. In general, the synthetic linear condensation polyamides do not exhibit fiber-forming properties unless their intrinsic viscosity is above 0.4, where intrinsic viscosity is defined as $$\frac{\log_e \eta_r}{C}$$

wherein $\eta_r$ is the viscosity of a dilute metacresol solution of the polyamide divided by the viscosity of metacresol in the same units and at the same temperature and $C$ is the concentration in grams of polyamide per 100 cc. of solution. In general, the toughness of a polyamide increases with its intrinsic viscosity. Polyamides having intrinsic viscosities between 0.6 and 2.0 are particularly useful in the present invention.

Synthetic linear condensation superpolyamides can be formed into filaments, sheets, etc., directly from the molten polymer or from solutions thereof. In the practice of this invention it is advantageous to rapidly cool the molten polyamide before cold working. A convenient method for accomplishing this purpose is to extrude the molten polyamide as a ribbon, sheet, or other form desired, directly into water or other nonsolvent liquid medium, e. g., chlorinated hydrocarbons, as described in a copending application of G. D. Graves, Serial Number 125,926, filed February 15, 1937. By this means the polyamide is made more susceptible to cold working. This susceptibility can frequently be further enhanced by having the polyamide wet or at least partly saturated with water when it is being cold worked.

In the preferred practice of my invention wherein the rod, sheet, or ribbon of the polyamide is passed between cold rolls, the rolling operation is continued until the surface area of the polymer has been at least doubled, and preferably until the surface area has been increased at least fourfold. However, a perceptible improvement in properties is obtained by only slight cold working. The desired degree of cold rolling can be effected by a single pass through the rolls or by several passes, the rolls being brought closer together after each passage. If desired, the cold rolling operation can be carried out as an integral part of the extruding operation. Thus, the molten polymer may be extruded through a suitable orifice into water and then passed between rollers or a series of rollers wherein it is cold rolled. The polymer will enter the rollers in the form of a rod, ribbon, or sheet, depending upon the nature of the extruding device. It is within the scope of this invention to subject the rolled product to cold drawing, e. g., in a transverse direction as it leaves the rollers. This improves the tear resistance in the longitudinal direction.

As indicated above, cold rolling increases the surface area of the polymer mass. If desired, this increase in area can be limited to one direction. Thus, if a thin ribbon is passed through the rollers in one direction only without appreciable tension, its length is greatly increased but its width remains about the same. If the rolling is done under sufficient tension, its width will actually decrease. For most purposes this decrease in width is undesirable since it decreases the tear resistance of the product in the longitudinal direction. In general, it is desirable to cold roll the product in more than one direction since this gives a product of more nearly uniform properties in all directions, as illustrated in subsequent Example II. The strength of polyamide sheets rolled both lengthwise and crosswise is greater than 10,000 lb./sq. in all directions. Rolling in two directions increases both the width and length of the material rolled.

While cold rolling is usually applied to a product which has not been cold drawn, it is possible to cold roll a product which has been cold drawn. However, cold drawn products cannot be cold rolled to the same extent as products which have not been cold drawn. For example, in a typical case a ribbon of polyhexamethylene adipamide which had been completely cold drawn was found on cold rolling to undergo a 22% increase in length and a 140% increase in width. On the other hand, a similar sample of polyhexamethylene adipamide ribbon which had not been cold drawn showed a 290% increase in length and an 80% increase in width on cold rolling. In these tests the product was cold rolled to the incipient breaking point.

Polyamide ribbons which have been cold rolled exhibit a different type of orientation than polyamide filaments which have merely been cold drawn. X-ray diffraction patterns obtained for polyamide ribbons which have been cold rolled are different depending upon whether the X-ray beam is passed perpendicular to the surface of the ribbon or edgewise, i. e., parallel to the rolling plane. In the case of a cold drawn filament, the X-ray diagrams are the same as long as the beam passes perpendicular to the fiber axis.

In contrast to sheets which have not been cold rolled or cold drawn, the cold rolled products are characterized by greater strength, better pliability, and in general better transparency. For example, the tensile strength of a specific sample of polyhexamethylene adipamide which had been cold rolled until it exhibited little further tendency to cold roll was 20,000 pounds per square inch whereas the strength of a film of the same sample of polyhexamethylene adipamide which was not cold rolled was approximately 6,000 pounds per square inch.

The invention is illustrated more specifically in the following examples:

*Example I*

A ribbon of polyhexamethylene adipamide having an intrinsic viscosity of 0.73 was prepared by extruding the molten polymer between rollers immersed in cold water. After 24 hours soaking in water, a sample of this ribbon measuring 4 x 0.22 x 0.065 inches was passed several times through an even-speed hand mill, bringing the rolls closer together after each passage. The final dimensions of the ribbon were 15.5 x 0.40 x 0.0085 inches corresponding to an increase in length of 288%, and an increase in width of 82%, or a total increase in area of about 600%. The cold rolled material showed parallel extinction with polarized light, even after annealing at 210° C. The ribbon was much more transparent than the original unrolled material. The tensile strength of the product in the direction of rolling was 20,000 pounds per square inch based on the original cross section.

*Example II*

A ribbon of one inch width and 0.015 inch thickness prepared by extruding molten polyhexamethylene adipamide having an intrinsic viscosity of about 1.0 into water was cut into strips one inch long. These strips were then treated as indicated below:

| Sample No. | Rolled | Thickness in inches after rolling | Tensile strength in lb./sq. in., based on— | | | |
|---|---|---|---|---|---|---|
| | | | Original dimensions* | | Dimensions at break | |
| | | | Lengthwise | Crosswise | Lengthwise | Crosswise |
| 1 | Lengthwise | 0.0085 | 20,700 | 6,350 | 38,100 | 25,460 |
| 2 | Crosswise | 0.0065 | 11,080 | 18,920 | 37,270 | 28,650 |
| 3 | Lengthwise and crosswise | 0.0065 | 13,230 | 14,460 | 28,960 | 30,130 |
| 4 | None | 0.0085 | 7,360 | 6,480 | | |

* Refers to the dimensions of the ribbon (rolled in samples 1–3) as placed in the Scott tensile strength machine.

The cold rolled products were in every case more transparent and much more pliable than the unrolled material. The most pliable product was sample 3. Sample 3 also differed from the other samples in optical properties. Samples 1 and 2 behaved as anisotropic materials between crossed Nicols and gave interference figures of low birefringence which are believed to be acute bisectrix figures of large optic angle, while sample 3 gave highly colored acute bisectrix figures with an estimated optic angle of about 60–70°.

Example III

A cold drawn polyhexamethylene adipamide bristle of one foot length and 0.024 inch diameter was cold rolled by passing it lengthwise through two closely spaced rollers. The product, which was useful as a straw substitute, had the following approximate dimensions: 0.007 x 0.05 x 16 inches.

Example IV

A piece of ribbon of 0.0155 x 2.75 x 12.0 inches dimensions, made from polyhexamethylene adipamide of intrinsic viscosity 1.0, was cold rolled in a single pass in the lengthwise direction to a ribbon measuring 0.0065 x 2.75 x 28.7 inches. The tensile strength of the product based on the dimensions at break were 27,130 lb./sq. in. in the direction of rolling and 9,840 lb./sq. in. in the crosswise direction.

In the examples, cold rolling is carried out at ordinary temperatures. The rolling operation can be carried out at more elevated temperatures providing the temperature selected is substantially below the melting point of the polymer. For example, polyhexamethylene adipamide which melts at approximately 263° C., can be successfully cold rolled at temperatures as high as 200°, providing the polymer is not kept at this temperature for a long period of time.

This invention can also be applied to polymers containing softening or plasticizing agents; in fact, plasticizers frequently facilitate cold rolling. Furthermore, modifying agents such as pigments, fillers, resins, antioxidants, cellulose derivatives, dyes, etc., may be employed. It is also possible to incorporate modifying agents, e. g., plasticizers, with the polymer during cold working.

In cold rolling ribbons, sheets, and the like, it is generally unnecessary to apply tension to the material as it leaves the rolls. However, if the material to be rolled is lacking in uniformity, it is desirable to feed the material to the rolls under tension and wind up the cold rolled product under tension, since this gives a more uniform product and avoids wrinkling. Steaming the cold rolled material for a short time, preferably while under tension, and drying it under tension improves its properties, particularly its ability to retain its shape.

The polyamides best suited to the practice of this invention have an intrinsic viscosity above 0.6. Of these polyamides a particularly valuable class are those derived from diamines of formula $NH_2CH_2RCH_2NH_2$ and dicarboxylic acid of formula $HOOCCH_2R'CH_2COOH$ or amide-forming derivatives thereof in which R and R' are divalent hydrocarbon radicals free from olefinic and acetylenic unsaturation and in which R has a chain length of at least two carbon atoms. An especially valuable group within this class are those in which R is $(CH_2)_x$ and R' is $(CH_2)_y$, where $x$ is at least 2 and $y$ is at least 1. Examples of polyamides falling within one or both of these classes are polytetramethylene adipamide, polytetramethylene sebacamide, polyhexamethylene adipamide, polyhexamethylene sebacamide, polyoctamethylene adipamide, polydecamethylene adipamide, and polydecamethylene para-phenylene diacetamide. However, polyamides which do not fall within these preferred classes can also be cold rolled to advantage. The invention is, for example, applicable to polyamides derived from amino acids, e. g., 5-aminocaproic acid, 9-aminononanoic acid, and 11-aminoundecanoic acid. It is also within the scope of this invention to cold roll mixtures of preformed polyamides as well as interpolyamides derived from a mixture of polyamide-forming reactants, e. g., two or more diamines with one or more dicarboxylic acids. As a specific example of such an interpolyamide might be mentioned that derived from equimolecular amounts of hexamethylenediamine, decamethylenediamine, adipic acid, and sebacic acid.

This invention has been described with particular reference to polyamides because the treatment described herein yields with these polymers the most valuable products. It is possible, however, particularly through observance of the means previously described for increasing the susceptibility of the polymers to cold working, to obtain by the practice of this invention valuable oriented articles from the other fiber-forming polymers described in the above-mentioned patents, as for instance the polyesters, polyacetals, polyethers, and ester-amide interpolymers.

This invention provides a convenient method for the preparation of articles of great strength, toughness, and pliability from synthetic linear condensation polymers. As indicated in the examples, polyamide sheeting having a tensile strength as high as 20,000 lb./sq. in. (based on the original dimensions of the cold rolled material) can be prepared by the process of this invention. This compares with strengths of about 6,000 lb./sq. in. for cellulose acetate, 9,000 lb./sq. in. for cellulose nitrate, and 8,000 lb./sq. in. for ethyl cellulose, which are among the more important plastic materials now used in making sheets, ribbons, and the like. Cold rolling also serves as a method for improving the clarity of the articles. The products of this invention are more useful than those of the same composition and shape which have not been cold rolled. As a method for improving the properties of rods, sheets, ribbons, and the like cold rolling is of wider application than cold drawing, since it is not limited to objects of smaller diameter or thickness. For example, while a ribbon one inch wide and 0.5 inch thick cannot be cold drawn satisfactorily, it can readily be cold rolled. Another advantage of cold rolling over cold drawing is that cold rolling can be limited to relatively small increases in dimensions without giving a non-uniform product, whereas cold drawing must be complete or a non-uniform product is obtained, i. e., a product consisting of cold drown and undrawn areas. The cold rolled products are useful in many applications. For example, the cold rolled sheets are useful as safety glass interlayers, electrical insulation, photographic films, leather substitutes, etc. The cold rolled thin sheets or foils are useful for wrapping and decorative purposes. The cold rolled filaments are useful as artificial straw. In some instances cold rolling can be applied to advantage to fabrics, e. g., balloon, parachute, and sail cloth, made from filaments of synthetic linear condensation polymers. The rolling serves to give a product which is less permeable to air. When applied in the form of die stamping, cold working provides a very useful method for making articles, such as containers, from synthetic linear condensation polymers. In this modification of the invention a sheet of the polymer is cold worked while being shaped in the die.

As many apparently widely different embodiments of this invention may be made without departing from the spirit and scope thereof, it is to be understood that I do not limit myself to the specific embodiments thereof except as defined in the appended claims.

I claim:

1. In the manufacture of products exhibiting by X-ray diffraction patterns molecular orientation, the step which comprises subjecting a synthetic linear condensation polymer to cold working through the application of sufficient compressive stress to cause flow of the solid polymer; the said polymer being one which is capable of being drawn into fibers showing by characteristic X-ray patterns orientation along the fiber axis.

2. The step in the manufacture set forth in claim 1 in which said polymer is a polyamide and said cold working consists in cold rolling.

3. In the manufacture of articles from polymeric products, the step which comprises subjecting a synthetic linear condensation polymer to cold working through the application of compressive stress in a preferred direction with flow of the solid polymer, and continuing the cold working until the polymer exhibits by X-ray diffraction patterns molecular orientation and increased tensile strength; the said polymer being one which is capable of being drawn into fibers showing by characteristic X-ray patterns orientation along the fiber axis.

4. The step in the manufacture set forth in claim 3 in which said polymer is a polyamide and said cold working consists in cold rolling.

5. In the manufacture of articles from polymeric products, the steps which comprise cold working, through the application of compressive stress, a water-wet synthetic linear polyamide; the said polyamide being one whose intrinsic viscosity is above 0.4.

6. The process set forth in claim 9 wherein the cold working consists in cold rolling.

7. In a process for improving the properties of shaped articles such as filaments, ribbons, sheets, and the like comprising a synthetic linear condensation polyamide whose intrinsic viscosity is above 0.4, the step of cold rolling said articles until their surface area has been at least doubled.

8. A process for improving the properties of a shaped article, such as a filament, ribbon, sheet, and the like consisting essentially of synthetic linear condensation polyamide whose intrinsic viscosity is above 0.4 which process comprises cold rolling said article in more than one direction until its surface area has been at least doubled.

9. A sheet material which always exhibits substantially different X-ray patterns when the X-ray beam is passed perpendicular to the surface of the sheet than when the beam is passed in any direction parallel to the surface of the sheet, the said sheet consisting essentially of synthetic linear condensation polyamide.

10. In the manufacture of articles from polymeric products, the step which comprises subjecting a polyamide obtainable from a polymerizable monoaminomonocarboxylic acid to cold working through the application of compressive stress in a preferred direction with flow of the solid polymer, and continuing the cold working until the polymer exhibits by X-ray diffraction patterns molecular orientation; the said polyamide being one which is capable of being drawn into fibers showing by characteristic X-ray patterns orientation along the fiber axis.

11. In the manufacture of articles from polymeric products, the step which comprises subjecting a polyamide obtainable from a diamine and a dicarboxylic acid by condensation polymerization to cold working through the application of compressive stress in a preferred direction with flow of the solid polymer, and continuing the cold working until the polymer exhibits by X-ray diffraction patterns molecular orientation; the said polyamide being one which is capable of being drawn into fibers showing by characteristic X-ray patterns orientation along the fiber axis.

12. A sheet material which always exhibits substantially different X-ray patterns when the X-ray beam is passed perpendicular to the surface of the sheet than when the beam is passed in any direction parallel to the surface of the sheet, the said sheet consisting essentially of synthetic linear condensation polymer.

JOHN B. MILES, Jr.

CERTIFICATE OF CORRECTION.

Patent No. 2,244,208.                  June 3, 1941.

JOHN B. MILES, JR.

It is hereby certified that error appears in the printed specification of the above numbered patent requiring correction as follows: Page 1, second column, line 23, for "decsribed" read --described--; page 2, first column, line 52, after "sq." insert the abbreviation --in.--; page 4, first column, line 41, claim 6, for the claim reference numeral "9" read --5--; and that the said Letters Patent should be read with this correction therein that the same may conform to the record of the case in the Patent Office.

Signed and sealed this 29th day of July, A. D. 1941.

(Seal)                                                         Henry Van Arsdale,
                                                            Acting Commissioner of Patents.